3,835,083
MELAMINE-FORMALDEHYDE RESIN SOLUTIONS
Arie Tinkelenberg, Sittard, Netherlands, assignor to
Stamicarbon B.V., Heerlen, Netherlands
No Drawing. Filed Feb. 5, 1973, Ser. No. 329,333
Claims priority, application Netherlands, Feb. 5, 1972,
7201532; July 28, 1972, 7210402
Int. Cl. C08g 9/30, 51/24
U.S. Cl. 260—29.4 R           18 Claims

ABSTRACT OF THE DISCLOSURE

A process for preparing stable melamine-formaldehyde resin solutions having improved properties is disclosed, wherein an aqueous solution of a water-soluble silicate if present before, during or after the condensation reaction of the melamine and formaldehyde.

The resulting resin solutions are suitable for a variety of end uses wherein melamine-formaldehyde resins have been previously used, including the impregnation of paper to be used in laminates.

BACKGROUND OF THE INVENTION

The present invention relates to a process for preparing melamine-formaldehyde resin solutions.

Melamine-formaldehyde resin solutions are generally prepared by reacting melamine and formaldehyde in an aqueous alkaline medium, at a molar ratio of formaldehyde:melamine of between 1:1 and 6:1, preferably between 1.5:1 and 2.5:1, at a pH of between 8 and 10 and a temperature between 85° C. and the boiling point of the reaction mixture. The melamine-formaldehyde resin solutions so prepared are used mainly to impregnate paper, with the impregnated paper suitable for use as a starting product in the preparation of laminates and as a basic material for molding powders. Frequently, one or more compounds are added as modifiers prior to, during, or after the reaction, in order to improve the properties of the resin solution and/or of the end products.

The prior art has sought to discover a simple and cheap modifier which could be used in preparing melamine-formaldehyde resin solutions. It has been desired to improve the properties of the resin solution itself, such as the storage stability and viscosity thereof, as well as the properties of the end product prepared from the modified resin solution, such as the product gloss, lack of surface porosity, and/or non-adherence to polished plates after being subjected to compression.

SUMMARY OF THE INVENTION

Melamine-formaldehyde resin solutions are prepared by conventional methods, such as conducting the condensation reaction in an aqueous alkaline medium at a pH of about 8–10 and at a temperature of 85° C. to the boiling point of the reaction mixture. A water-soluble silicate which is an alkali metal silicate or a quaternary ammonium silicate is added to the resin solution before, during and/or after the condensation reaction. The silicate will be present in an amount corresponding to a $SiO_2$ content of about 0.05 to about 1.5% by weight, based on the total weight of the resin solution.

DESCRIPTION OF THE INVENTION

Improved melamine-formaldehyde resin solutions, especially those melamine-formaldehyde impregnating resin solutions used for the impregnation of decorative paper which is applied in the manufacture of laminated chip boards, can be produced by the addition of water-soluble silicates. The melamine-formaldehyde resin solutions are prepared by reacting melamine and formaldehyde in an alkaline medium with one or more water-soluble silicates heated prior to, during and/or after the condensation reaction, together with, if desired, other conventional modifiers.

The preparation of melamine-formaldehyde resin solutions is old, see, e.g. U.S. Pat. No. 2,197,357, U.S. Pat. No. 2,260,239 or U.S. Pat. No. 3,082,180, the disclosure of which is hereby incorporated by reference for the teaching of the resin solution preparation therein. The condensation reaction is normally conducted in an aqueous alkaline system. As known to the art, the reaction medium may be based primarily upon water or upon a mixture of water and an alcohol, especially a lower alkanol.

The water-soluble silicates which are added to the melamine-formaldehyde resin solutions are alkali metal silicates such as, for instance, lithium silicate, sodium silicate and potassium silicate, and quaternary ammonium silicates, such as, for instance, tetraethanolammonium silicate and the like. Generally, the substituents on the quaternary ammonium atom, besides the silicate, are alkyl of 1–4 carbon atoms. The silicates which are used in the present invention normally have a molar ratio of $SiO_2$ to cation of 25:1 to 0.5:1, preferably 5:1 to 2:1. Of course, mixtures of these silicates may be used if desired. Because of its ready availability and successful results, the use of aqueous solutions of sodium silicate (also called water glass) are preferred. Particularly suitable sodium silicate solutions are those containing from 10–20% of $SiO_2$.

The process of the present invention makes use of an aqueous solution of the aforesaid silicates. Such a solution may contain silicate particles having a gel-like or colloidal characteristic, particularly if the solution is stored for a prolonged period. It is to be understood that the term "silicate solution" means those combinations of water and silicate and, optionally, other additives, as can be considered a solution for practical purposes and in which the major portion of the silicate is present in a dissolved state.

By way of contrast, the addition of colloidal silica (also called silica-sol) to a melamine-formaldehyde resin solution in amounts corresponding to between 0.05% and 1.5% by weight of $SiO_2$ in the resin solution, has practically no effect upon the properties of the resin solution and upon the objects prepared therefrom, and such addition does not produce the advantages which can be obtained by the process according to the present invention.

The process of the present invention can produce melamine-formaldehyde resin solutions which have different characteristics, making such solutions suitable for different end uses. In particular, the melamine-formaldehyde resin solutions produced by adding the silicates after the condensation reaction is completed, appear to be different from similar solutions to which the silicates were added before and/or during the condensation reaction.

The pH of the formaldehyde solution and of the reaction mixture during the condensation reaction is normally controlled by the prior art through the addition of alkali metal compounds such as sodium carbonate or sodium hydroxide. In the embodiment of the process of the present invention, wherein an aqueous solution of one or more silicates is added to the formaldehyde solution before the condensation reaction, or is added to the reaction mixture during the condensation reaction, the pH value of the formaldehyde solution or the pH value of the reaction mixture during the condensation is controlled, because of the alkaline characteristic of the silicate solution, without the addition of other pH control additives.

In this embodiment, generally the maximum of water soluble silicate which will be added corresponds to a $SiO_2$ content of about 0.15% by weight, based on the weight of the resin solution eventually formed. The maximum amount of silicate which can be added depends, among other factors, upon the type of silicate, both as regards other cation present in the silicate and the molar ratio of cation to $SiO_2$. For instance, when using a solution of tetraethanolammonium silicate having a molar ratio of $SiO_2$:cation of 22:1 the maximum $SiO_2$ content of the resin solution will generally be about 0.15% by weight. On the other hand, when the sodium silicate solution, having a molar ratio of $SiO_2$:$Na_2O$ of 3.3:1 is used, the maximum $SiO_2$ content of the resin solution is about 0.10% by weight. When using a sodium silicate solution, an amount of silicate corresponding to a $SiO_2$ content of the resin solution of about 0.08–0.09% by weight will, in most cases, maintain the pH prior to and during the condensation reaction at the desired level.

The addition of large amounts of silicate solution results in the formation of resin solutions which have little storage stability and a decided tendency to gelatinize. However, the addition of the rather small quantities of silicate solution to the formaldehyde solution or during the condensation reaction according to this embodiment of the process of the present invention results in the formation of resin solutions having a decidedly increased storage stability. These resin solutions show a less sharp decrease of the pH value and a less sharp increase of the resin solution viscosity during storage than do the corresponding resin solutions prepared by using alkali metal compounds such as sodium carbonate or sodium hydroxide as the pH control additive, and without the addition of water soluble silicates.

Other conventional modifiers may also be added to the melamine-formaldehyde resin solution, either before, during or after the condensation reaction, as known to those in the art. The effect of the addition of the water-soluble silicate solution according to this embodiment of the process of the present invention is most apparent, however, in the case of resin solutions which are otherwise unmodified. In another embodiment of the process of the present invention, an aqueous silicate solution is added to the melamine-formaldehyde resin solution after the termination of the condensation reaction. The silicate-containing resins obtained by this embodiment are extremely suitable for the impregnation of paper and other fibrous materials and fabric especially for subsequent process of the impregnated material to laminates. The silicate-containing resin solutions are also suitable for being processed into molding powders and the like, according to conventional techniques. The addition of a silicate solution to a melamine-formaldehyde resin solution according to this embodiment offers many advantages. The impregnation of paper and other materials with the resulting resin solutions proceeds smoothly, and the impregnation apparatus is extremely easy to clean after completion of the impregnation step. After drying, the surface of the impregnated material is smooth and attractive in appearance.

Normally, the content of volatile material in a paper impregnated with conventional melamine-formaldehyde resins (silicate-free resins) is quite critical. In contrast, the content of volatile material of the dried paper which is impregnated with the silicate-containing resin solution of this embodiment may vary between 4.5 and well over 7% by weight, without detrimentally affecting the quality of the resulting laminate, particularly without affecting the continuity or porosity of the laminate surface. When a paper impregnated with a melamine-formaldehyde resin is pressed to form a laminate, it is of great importance that the laminate does not stick to the polished plates of the press. The use of a silicate-resin solution according to this embodiment greatly reduces the risk of laminate surface damage and facilitates the ease of removing the finished product from the press by virtually eliminating sticking of the laminate to the polished plates.

The surfaces of laminates produced from resin solutions of this embodiment are more continuous, with less porosity, than are the surfaces of laminates produced using resin solutions which contain no silicates. In addition, the gloss and cracking resistance of the laminates produced from the resin solutions of this embodiment are also very good, and the wear resistance is often slightly better than laminates produced from conventional resin solutions. It is quite remarkable that the same curing rates can be obtained with resin solutions obtained according to this embodiment of the process of the present invention at a pH of 8.0–8.4, as compared to silicate-free resin solutions having a pH value of 7.5–8. In spite of the relatively high pH value of the resin solution of the present embodiment, such resin solution can still be used to produce cured laminates by conventional processing which have excellent crack resistance.

The advantages obtained by using this embodiment of the present invention are the most striking if the silicate is added to a resin solution which contains no or only slight amounts of other modifiers. However, the addition of the silicate solution according to the present invention produces advantages even if the resin solution does contain substantial amounts of other modifiers, particularly if the resin solution and/or the paper impregnated with the resin solution is to be processed under unfavorable conditions. For instance, the resin solutions obtained according to the present invention, preferably brought to a pH of 7.5 to 7.9, are highly suitable for the impregnation of decorative paper which is pressed onto chip board to form a laminated chip board by the so-called "Kurztakt" or "short stroke" process (wherein the impregnated paper is pressed on the chip board for a few seconds in a heated press after which the formed laminate is taken out of the press and allowed to cool).

The two embodiments of the process of the present invention described above may be used separately or in combination. For instance, in the preparation of a resin solution having a silicate content corresponding to a $SiO_2$ content of about 0.3–0.7% by weight, it is generally advantageous to add a water-soluble silicate as the pH control additive during the condensation reaction, and after the condensation reaction is terminated, to add the rest of the silicate. The remainder of the silicate may be added, in some instances, shortly before use.

When a concentrated silicate solution is added to the melamine-formaldehyde resin solution, the risk of flocculation and gel formation is rather substantial. Preference is therefore given to the addition of a silicate solution containing 10–20% by weight, particularly about 15% by weight of the silicate. In order to prevent flocculation and irreversible gel formation, the pH of the resin solution should be less than 10, preferably less than about 9, during and after the addition of the silicate solution. The pH value of the resin solution can be easily maintained below the aforesaid values, by the addition of an acid. effect of the addition is less noticeable, wherein the addition or together with the silicate. In many cases an amount of acid will be used such that a catalyzed resin solution having a pH value of 8.0–8.4 or 7.5–7.9 is thereby formed. Preferably, the amount of silicate which is added corresponds to a $SiO_2$ content of 0.2–1.5% by weight, based on the weight of the resin solution containing the silicate. If smaller amounts of the silicate are added, the effect of the addition is less noticeable, wherein the addition of greater amounts of silicate does not offer any particular advantages and increases the risk of gelation of the silicate-containing resin solution. Particularly good results are obtained by the addition of a solution of sodium silicate ("water glass") to the melamine-formaldehyde resin solution in an amount corresponding to a $SiO_2$ content of the resin solution of about 0.3–0.7% by weight. It will be appreciated, of course, that the maximum amount of water-soluble silicate which can be added without risking resin solution gelation or without the resin solution becoming turbid depends upon the type of silicate added. When a tetraethanolammonium silicate solution having a molar ratio of $SiO_2$ to cation of 22:1 is added, the maximum $SiO_2$ content of the resin solution is about 1.5% by weight, while with the addition of a sodium silicate solution having a $SiO_2$-$Na_2O$ molar ratio of 3.3:1, the maximum $SiO_2$ content of the resin solution is 0.8–0.9% by weight. The stability of the resin solution to which the silicate solution has been added is generally about ½ to 3 days, depending upon the amount of silicate added. For instance, a catalyzed resin solution containing 0.6% by weight of $SiO_2$ is stable for about 12–16 hours at room temperature conditions and a solution containing 0.4% by weight of $SiO_2$ is stable for about 24 hours. This solution stability is sufficient to be able to prepare a supply of catalyzed silicate-containing resin solution adequate for one working day or one shift.

Any remainders of the silicate-containing resin solution need not be discarded, however, as mixing the catalyzed silicate containing resin solution with a 4–5 times greater volume of an uncatalyzed resin solution which contains no silicate or any very small amounts of silicate results in the formation of a resin solution which will remain stable for several days.

As mentioned hereinabove, an acid is normally added to the resin solution as a curing catalyst, with the acid addition lowering the pH to a value of about 7.5 to 8.5, depending upon the particular application. It is possible to first mix the required amounts of silicate solution and acid, and then add the acid silicate solution so obtained to the resin solution, and this process appears simple and attractive on its face. However, a problem exists in that the acid silicate solutions are generally unstable. Depending upon the type of acid, the pH and the silicate content, a solution of this type will gel within a few hours, at best within a few days. For instance, a solution having a greater than 3 and a silicate content of more than 3% by weight, calculated as $SiO_2$, will gel within a few seconds. Stable acid silicate solutions can be obtained, in a preferred embodiment of the process of the present invention, by mixing an aqueous silicate solution, having an $SiO_2$ content of about 10 to about 25% by weight, with a solution of a relatively strong acid, especially sulphuric acid, a hydro-halogen acid, such as hydrochloric acid or hydrobromic acid, formic acid, sulphamic acid and aryl sulphonic acids having from 6–10 carbon atoms in the aryl group, especially toluene sulphonic acid, until the mixture has a pH of between 0.5 and 3.0, and after adding from 10–50% by weight, based on the total weight of the resulting solution, of at least one water-soluble organic stabilizer which is substantially neutral in water. Suitable stabilizers include alkanols containing 1–12 carbon atoms, polyols and polyol ethers of the formula

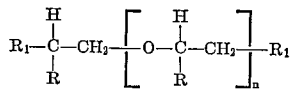

wherein $n$ is 0 to 4, R is hydrogen or methyl and each $R_1$ is independently selected from the group consisting of hydroxy and alkoxy of 1 to 6 carbon atoms, other polyhydric alcohols, N,N-dialkyl amides of a carboxylic acid of 1 to 4 carbon atoms, wherein the alkyl groups independently contain 1–4 carbon atoms, dialkyl sulfoxides, wherein each alkyl group independently contains from 1–4 carbon atoms, and lactams of 4 to 7 carbons atoms. The resulting solution has a $SiO_2$ content of about 2 to about 15% by weight.

Following this procedure, acid silicate solutions may be obtained which are stable for from 1–3 or more months at room temperature before noticeable gelation will occur. These solutions are hereby designated acid silicate solutions, but it is clear that they might also be considered to be silicic acid solutions, which have been acidified if necessary. In this connection, a silicate solution is understood to mean all aqueous systems containing silicate or silicic acid which present themselves to the naked eye as a solution and which can be treated as a solution, independent of the actual state of the aggregation of the molecules and ions present.

If an acid silicate solution obtained according to this embodiment is mixed with a melamine-formaldehyde resin solution, the risk of flocculation of the silicate is greatly reduced, so that the mixing may be conducted without preparation precautions.

It is preferred to use relatively strong acids in this embodiment of the process of the present invention. These acids include sulphamic acid and toluene sulfonic acid. As indicated above, however, it is also possible to use hydrochloric acid or sulphuric acid or formic acid, although these acids result in silicate solutions having slightly less stability. Very good results are achieved with the use of toluene sulphonic acid, which is usually in the form of the mixture of the ortho and para isomers thereof, both in relation to the ease with which the acid silicate solution is prepared and to the stability of the acid silicate solution, and as to the property of the melamine resin solution which has been modified through the addition of the acid silicate solution.

When this embodiment involving the acid silicate solution is used, it is preferred that the silicate be sodium silicate or potassium silicate (or mixtures thereof). The aqueous sodium or potassium silicate solution should be added slowly to the solution of the acid, with stirring. In order to avoid the risk of gelation caused by an excessive local increase of pH, it is generally preferred that the silicate solution be added directly beneath the surface of the acid solution. The pH of the acid silicate solution should be between 0.5 and 3.0, and it is decidedly preferred that the pH of this solution be below about 2.

Thereafter, the stabilizer is added to the acid silicate solution. Liquid stabilizers can be added without any special measures, while solid stabilizers are preferably added in the form of a solution thereof. During the stabilizer addition, some heat may be developed, which may be removed, if desired, by cooling. It is preferred that the sodium and/or potassium silicate be in the form of an aqueous solution having a high $SiO_2$ content for instance, a $SiO_2$ content of about 10–25% by weight at a molar ratio of $SiO_2$:alkali metal oxide of about 3–4. The acid silicate solutions produced according to this embodiment generally have a $SiO_2$ content of about 2 to about 15% by weight, preferably about 3–8% by weight.

It is decidedly preferred to use as stabilizers for the acid silicate solution those compounds which have a favorable influence on the properties of the resin solutions. In general, such compounds are mono or multivalent alcohols, wholly or partly etherified multivalent alcohols acid amides, dialkyl sulphoxides and lactams. Amino compounds, such as urea and ethylene diamine, are less suitable as stabilizers, as are other compounds which in water form acid or basic solutions. Examples of compounds which are suitable stabilizers according to this embodiment of the process of the present invention are ethylene glycol, propylene glycol, glycerol, diethylene glycol, triethylene glycol, tetraethylene glycol, dipropylene glycol, phenoxyethanol, the monomethyl-, monoethyl-, monopropyl- and monobutyl-ethers of diethylene glycol and of triethylene glycol, the lower dialkyl ethers of diethylene glycol and triethylene glycol, dimethyl sulphoxide, diethyl sulphoxide, dimethyl formamide, diethyl formamide, γ-butyrolactam, δ-valerolactam, ε-caprolactam and N-methyl pyrrolidone. Particularly preferred compounds are ethylene glycol, diethylene glycol, triethylene glycol, lower monoalkyl- and dialkyl-ethers of these glycols, acid amides and ε-caprolactam. Mixtures of stabilizers may be used if desired. The stabilizers or stabilizer are added in amounts of from 10-50% or more by weight, based on the weight of the stabilized silicate solution.

In the incorporation of the stabilized acid silicate solution in melamine-formaldehyde resins, generally such amounts of acid, silicate and stabilizer are chosen that after the addition thereof to the melamine-formaldehyde resin, the desired combination of $SiO_2$ content (which is preferably 0.3-0.7% by weight), modifier content and pH is obtained. A particularly desirable combination for silicate solution stability and resin properties is based on starting from toluene sulphonic acid, sodium silicate solution containing about 15% by weight of $SiO_2$ and having a molar ratio of $SiO_2:Na_2O$ of 3.3, and monoethyl- or monobutyl-ether of diethylene glycol and/or triethylene glycol. The stability of the acid silicate solution increases as the glycol ether content increases, but the properties of the melamine-formaldehyde resin drop with increased glycol ether content. The optimum point lies at a glycol ether content of the silicate solution of about 20-40% by weight. It will be clear that different optimum points may exist for other stabilizer/modifier combinations.

EXAMPLES OF THE INVENTION

The invention will be understood more readily by reference to the following examples; however, these examples are intended to illustrate the invention and are not to be construed to limit the scope of the invention.

Example A

This Example and Example B-D relate to the preparation of an acid silicate solution which is storage stable.

340 g. of sodium silicate solution (18% by weight silicate, molar ratio $SiO_2:Na_2O$ of 3.3:1) were added at room temperature to 425 g. of a 25% by weight solution of toluene sulphonic acid monohydrate in water through a tube which is discharged below the liquid surface of the acid solution, and with stirring. After the addition of the silicate solution was completed, 235 g. of the monoethyl ether of triethylene glycol were added to the resulting mixture. The resulting acid silicate solution had a pH of about 1.2 and a storage stability of about 60 days at 18° C.

Example B

An acid silicate solution was prepared from 340 g. of a 18% sodium silicate solution and 425 g. of a 25% toluene sulphonic acid solution using the procedure of Example A above. 300 g. of a 75% caprolactam solution in water were added as stabilizer. The resulting acid silicate solution had a storage stability of about 15 days at 18° C.

Example C

Following the procedure of Example 1 above, an acid silicate solution was prepared from 355 g. of an 18% sodium silicate solution, 445 g. of a 25% toluene sulphonic acid solution and 250 g. of dimethyl formamide. The acid silicate solution obtained had a storage stability of about 45 days at 18° C.

Example D

Following the procedure of Example A above, an acid silicate solution was prepared from 355 g. of an 18% water glass solution, 445 g. of a 25% toluene sulphonic acid solution, and 250 g. of dimethyl sulphoxide. The resulting solution had a storage stability of about 45 days at 18° C.

Example I

This example relates to the preparation of an impregnating resin solution using a stabilized acid silicate solution.

7.6% by weight of the stabilized acid silicate solution prepared for Example A, based on the weight of resin solution, were added to a conventional melamine-formaldehyde resin solution, which had a molar ratio of formaldehyde-melamine of 1.65.

The resulting mixture was divided into two parts.

Approximately 0.75% by weight, based on the weight of the resin solution, of an 18% sodium silicate solution was added to one part of the resin solution to produce a pH thereof between 8.1 and 8.2. The resulting solution was used to impregnate α-cellulose type paper having a weight of 80 gm./m.$^2$, with the paper impregnated with about 55% by weight of the resin, based on the weight of the paper. The paper was dried to a volatile material content of about 5.5% by weight, and then used in laminate production. Laminates were produced by laminating the impregnating paper on chip board on a multi-layer press utilizing back cooling, at a temperature of 150° C. and a pressure of 20 kg./cm.$^2$.

0.1% by weight of an 18% sodium silicate solution was added to the second portion of the resin solution, resulting in a pH value of the resin solution of between about 7.6. The resulting solution was used to impregnate paper in a manner similar to that described above. The resulting impregnating paper was laminated into chip board using the Kurztakt process, using, during about 50 seconds, a pressure of 25 kg./cm.$^2$ and a temperature of 170° C.

The two types of laminates produced from the 2 resin solution parts described above had highly continuous surfaces, high crack resistance, and did not stick to the polished plates of the press when detached therefrom. The other properties of the laminates, such as gloss and chemical and mechanical resistance, were at least equivalent to the best results which could be contained with resin solutions modified with compounds other than silicates.

Example II

A silicate-containing melamine-formaldehyde resin solution was prepared by adding an 18% water glass solution (having a molar ratio of $SiO_2:Na_2O$) of 3.3:1) to 690 parts of 30% formalin in a reactor until the pH of the mixture was 9.0. Then 540 parts of melamine and 90 parts of water were added to the reactor, and the reactor contents were heated to 95° C. and maintained at that temperature until a water toleration of 1.1 g. of water/g. of resin was reached.

After the reaction was complete, the pH of the resin solution was increased to a value of 9.7 by the addition of more of the water glass solution. The resulting resin solution contained an amount of sodium silicate corresponding to a $SiO_2$ content of 0.08% by weight, based on the weight of the resin solution.

For comparative purposes, two additional resin solutions were prepared in the same manner as in Example I, using, however, instead of the water glass a sodium hydroxide solution and a sodium carbonate solution as the pH control additives. These latter resin solutions were designated Comparative Examples II-A and II-B, respectively.

The three resin solutions (those of Example II and II-A and II-B) were stored at 20° C. and compared during storage for change in viscosity and pH value, with the results of the viscosity results summarized in Table 1 below, wherein it will be noted that the viscosity of the resin solution of Example II increased the least. The pH of the silicate-containing resin solution remained constant for 25 days at 9.7, while the pH of the resin solution of Comparative Example II-B decreased from 9.7 to 9.6 in 20 days, and that of the resin solution of Comparative Example II–A decreased from 9.7 to 9.1 in 15 days.

TABLE 1

|  | Example II, prepared with water glass | | Comparative Example II-A, prepared with sodium hydroxide | | Comparative Example II-B, prepared with sodium carbonate | |
| --- | --- | --- | --- | --- | --- | --- |
|  | Viscosity, cp. | Increase, percent | Viscosity, cp. | Increase, percent | Viscosity, cp. | Increase, percent |
| Start | 25 |  | 30 |  | 26 |  |
| After 5 days | 26 | 4 | 33 | 10 | 28 | 7.5 |
| After 10 days | 27 | 8 | 36 | 20 | 30 | 15.5 |
| After 15 days | 27.5 | 10 | 41 | 36 | 31.5 | 21 |
| After 20 days | 28 | 12 |  |  | 32.5 | 25 |
| After 25 days | 29 | 16 |  |  |  |  |

Example III

Using the procedure described in Example II, resin solutions were prepared having different degrees of condensation, expressed as water tolerance in g. of water/g. of resin using the water glass described in Example II as the pH control additive. For comparative purposes, similar resin solutions were prepared using sodium hydroxide and sodium carbonate as the pH control additives. The stability of these three resin solutions, which were otherwise unmodified, at 20° C., was determined, with the result summarized in Table 2 below.

TABLE 2

Maximum stability, in days, at different degrees of condensation

| pH control additive | Water tolerance of resin | | | | |
| --- | --- | --- | --- | --- | --- |
|  | 1.25 g./g. | 1.15 g./g. | 1.05 g./g. | 0.95 g./g. | 0.85 g./g. |
| Water glass | 26 | 26 | 22 | 19 |  |
| Sodium carbonate | 20 | 20 | 19 | 13 | 10 |
| Sodium hydroxide |  |  | 15 | 10 | 7 |

Examples IV–XXXI

A melamine-formaldehyde resin solution was prepared at a temperature of 90–95° C. and a pH of about 9.2 steel reactor having a volume of 60 liters. The resin solution had a molar ratio of formaldehyde:melamine or 1.62. 3.4% by weight of ε-caprolactam, 4.35% by weight of mixed ortho- and para-toluene sulphonameate and 1.8% by weight of refined sugar crystals, all percentages based on the weight of melamine, were used as co-condensed modifiers. Prior to the condensation reaction, the 30% formalin solution was brought to a pH of 9.2 through the addition of 13% by weight sodium silicate solution having a $SiO_2:Na_2O$ molar ratio of 3.3:1. The resulting resin solution had a capability of dilution by water of 0.7 g. water/g. of resin, a theoretical solids content of 55% by weight, and a $SiO_2$ content of 0.086% by weight.

The resulting resin solution was divided into 28 parts, corresponding to Examples 4–31. To certain of the portions different amounts of a 13.7% by weight sodium silicate solution was added, with the total $SiO_2$ content indicated in Table 3 below. The resin solutions were brought to the pH indicated in Table 3 through the addition of formic acid. Using the resulting catalyst resin solutions so obtained, decorative papers having a weight of 80 g. per square meter were impregnated with about 55% by weight of the resin, based on the weight of the paper, dried to the volatile material content indicated in Table 3, and thereafter laminated onto chip board using the conventional process at 150° C. and a pressure of 20 kg./cm.², in a cycle involving 3 minutes of heat, 6 minutes of standing time, and 3 minutes of cooling.

The properties of the resulting laminates were determined. In each instance, the resistance to cracking was good or excellent, as was the resistance to steam and boiling water. The gloss was determined visually and is reported in Table 3. The compactness of the surface was determined by wiping a small amount of black shoe polish onto the surface. The surface was considered less compact as the number of black spots remaining visible increased.

The degree of curing was determined by the Kiton test, using as reagent a solution of 2.5 cc. of a 3% solution of a dye (Kitonechtrot BL) in 1 liter of 2N hydrochloric acid. Five drops of the reagent were placed on the laminated surface and covered with a watch glass. After 1 hour the watch glass was removed and the surface was rinsed with water. Then the degree of coloration of the surface was determined, with the greater degree of cure of the resin indicated by the lesser degree of coloration of the surface.

The properties of the resin solution, and of the laminated chip board which was obtained, are summarized in Table 3 below, wherein the valuation figures represent the following values:

1 = excellent
2 = good
3 = fair
4 = poor
5 = very poor

TABLE 3

| Test No. | Percent of $SiO_2$ in resin solution | pH before impregnation | Percent of volatile material | Closeness of surface | Gloss | Curing degree (Kiton-test) |
| --- | --- | --- | --- | --- | --- | --- |
| 1 | 0.086 | 8.3 | 5.87 | 3–4 | 1–2 | 3 |
| 2 | 0.086 | 8.3 | 5.39 | 2 | 1–2 | 3 |
| 3 | 0.086 | 8.0 | 6.22 | 3–4 | 1 | 2–3 |
| 4 | 0.086 | 8.0 | 5.61 | 1–2 | 1 | 2 |
| 5 | 0.086 | 8.0 | 4.91 | 1–2 | 1 | 1–2 |
| 6 | 0.086 | 7.7 | 6.48 | 3–4 | 1 | 2 |
| 7 | 0.086 | 7.7 | 5.86 | 1–2 | 1 | 2 |
| 8 | 0.086 | 7.7 | 5.03 | 1 | 1 | 1–2 |
| 9 | 0.086 | 7.4 | 6.67 | 3 | 1 | 2 |
| 10 | 0.086 | 7.4 | 5.76 | 2–3 | 1 | 2 |
| 11 | 0.086 | 7.4 | 5.48 | 1 | 1 | 1–2 |
| 12 | 0.086 | 7.4 | 4.92 | 2 | 1 | 1–2 |
| 13 | 0.340 | 8.3 | 6.51 | 4–5 | 1–2 | 2 |
| 14 | 0.340 | 8.3 | 5.75 | 2 | 1 | 1–2 |
| 15 | 0.340 | 8.3 | 4.07 | 1–2 | 1 | 2 |
| 16 | 0.340 | 8.0 | 7.13 | 2 | 2 | 2 |
| 17 | 0.340 | 8.0 | 5.83 | 2 | 2 | 2 |
| 18 | 0.340 | 8.0 | 4.84 | 1 | 1 | 1–2 |
| 19 | 0.340 | 7.7 | 7.63 | 2 | 1 | 1–2 |
| 20 | 0.340 | 7.7 | 5.71 | 1 | 1 | 1–2 |
| 21 | 0.340 | 7.7 | 4.61 | 2 | 1 | 1–2 |
| 22 | 0.730 | 8.3 | 6.59 | 2 | 3 | 2 |
| 23 | 0.730 | 8.3 | 5.79 | 1–2 | 2 | 2 |
| 24 | 0.730 | 8.3 | 4.68 | 1–2 | 1–2 | 2–3 |
| 25 | 0.730 | 8.0 | 6.86 | 1 | 2–3 | 2 |
| 26 | 0.730 | 8.0 | 5.82 | 1 | 2 | 1–2 |
| 27 | 0.730 | 8.0 | 5.43 | 1 | 2 | 2 |
| 28 | 0.730 | 8.0 | 4.32 | 2 | 1 | 2 |

What is claimed is:

1. In a process for preparing a melamine-formaldehyde resin solution by reacting melamine and formaldehyde in an aqueous alkaline medium at a pH of about 8 to about 10 at a temperature of between about 85° C. and the boiling point of the reaction mixture, the improvement comprising adding an aqueous solution of at least one water-soluble silicate selected from the group consisting of alkali metal silicates and quaternary ammonium silicates, wherein the said silicate is present at least after the reaction in an amount corresponding to a $SiO_2$ content of about 0.05 to about 1.5% by weight, based on the total weight of said resin solution.

2. Process according to claim 1, wherein said aqueous solution of said silicate is added prior to and/or during the reaction in an amount such as to maintain the pH of the reaction mixture at a value of between about 8 and about 10.

3. Process according to claim 2, wherein the aqueous solution of said silicate is the only pH control additive present during the reaction.

4. Process according to claim 2, wherein the amount of said silicate added is at most that amount corresponding to a $SiO_2$ content of 0.15% by weight, based on the total weight of said resin solution.

5. Process according to claim 4, wherein said silicate is a quaternary ammonium silicate.

6. Process according to claim 4, wherein said silicate is an alkali metal silicate.

7. Process according to claim 6, wherein said alkali metal silicate is sodium silicate, and the amount of said silicate added corresponds at most to a $SiO_2$ content of about 0.10% by weight, based on the weight of said resin solution.

8. Process according to claim 2, wherein the amount of said silicate corresponds to a $SiO_2$ content of 0.08 to 0.09% by weight.

9. Process according to claim 1, wherein said aqueous solution of at least one water soluble silicate is added to the resin solution after termination of the reaction, while the pH of the resin solution is maintained at a value less than 10.

10. Process according to claim 9, wherein the amount of said silicate is at least that amount corresponding to a $SiO_2$ content of the resin solution of 0.2% by weight.

11. Process according to claim 10, wherein the amount of said silicate corresponding to a $SiO_2$ content of the resin solution of about 0.3 to 0.7% by weight.

12. Process according to claim 1, wherein said aqueous solution of at least one water soluble silicate contains about 10 to about 20% by weight of silicate.

13. Process as claimed in claim 9, wherein said aqueous solution of at least one water soluble silicate is prepared by mixing an aqueous solution of said silicate, with a solution of a relatively strong acid selected from the group comprising sulfuric acid, hydrohalogen acids, formic acid and arylsulfonic acids, wherein the aryl group contains 6 to 10 carbon atoms, until the pH of the mixture has a value between 0.5 and 3.0, and thereafter adding to the mixture from 10 to 50% by weight, based on the total weight of the resulting solution, of at least one water-soluble organic stabilizer substantially neutral in water selected from the group consisting of alkanols containing from 1 to 12 carbon atoms, polyols and polyol ethers of the formula

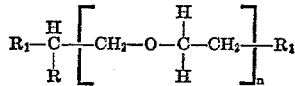

wherein $n$ is 0 to 4, R is hydrogen or methyl and each $R_1$ is independently selected from the group consisting of hydroxy and alkoxy of 1 to 6 carbon atoms, other polyhydric alcohols, N,N-dialkyl amides of a carboxylic acid of 1 to 4 carbon atoms, wherein the alkyl groups independently contain 1–4 carbon atoms, dialkyl sulfoxides, wherein each alkyl group independently contains from 1–4 carbon atoms, and lactams of 4 to 7 carbon atoms, wherein the resulting solution has a $SiO_2$ content of about 2 to about 15% by weight.

14. Process as claimed in claim 13, wherein a silicate aqueous solution is mixed with a solution of toluene sulphonic acid in an amount such that the pH of the resulting mixture is between 0.5 and 1.5, and thereafter between 20 and 40% by weight, calculated on the weight of the resulting solution, of a stabilizer selected from the group consisting of ethylene glycol, diethylene glycol, triethylene glycol, lower monoalkylesters and lower dialkyl esters of said glycols, wherein the alkyl groups independently contain 1–4 carbon atoms, ε-caprolactam and N,N-dialkyl formamide, wherein each alkyl group independently contains 1–4 carbon atoms, is added, wherein the $SiO_2$ content of the resulting solution is between 3–8% by weight.

15. A melamine formaldehyde resin solution of improved storage stability, said solution comprising at least one melamine- formaldehyde resin having a molar ratio of formaldehyde-melamine of about 1:1 and 1:6 in an aqueous medium, said solution also containing at least one water-soluble silicate selected from the group consisting of alkali metal silicates and quaternary ammonium silicates, wherein the silicates are present in an amount corresponding to $SiO_2$ content of about 0.05 to about 1.5% by weight, based on the weight of said solution.

16. Solution as claimed in claim 15, wherein said silicate is an alkali metal silicate.

17. Solution as claimed in claim 16, wherein said alkali metal silicate is sodium silicate.

18. Solution as claimed in claim 15, wherein said silicate is a quaternary ammonium silicate.

References Cited
UNITED STATES PATENTS

| | | | |
|---|---|---|---|
| 2,930,771 | 3/1960 | Wade | 260—29.4 R |
| 2,482,508 | 9/1949 | Rider | 260—67.6 R |

MELVIN GOLDSTEIN, Primary Examiner

W. C. DANISON, JR., Assistant Examiner

U.S. Cl. X.R.

260—67.6 R